(12) United States Patent
Rothman et al.

(10) Patent No.: US 8,255,721 B2
(45) Date of Patent: Aug. 28, 2012

(54) SEAMLESS FREQUENCY SEQUESTERING

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 1074 days.

(21) Appl. No.: 12/142,089

(22) Filed: Jun. 19, 2008

(65) Prior Publication Data

US 2009/0319759 A1 Dec. 24, 2009

(51) Int. Cl.
*G06F 1/32* (2006.01)

(52) U.S. Cl. .......................... 713/322; 718/1

(58) Field of Classification Search .................. 713/322; 718/1

See application file for complete search history.

(56) References Cited

U.S. PATENT DOCUMENTS

| | | | |
|---|---|---|---|
| 7,376,949 B2 * | 5/2008 | Lowell et al. ..................... | 718/1 |
| 7,516,336 B2 * | 4/2009 | Rothman et al. ............... | 713/300 |
| 2009/0271646 A1 * | 10/2009 | Talwar et al. ................. | 713/322 |

* cited by examiner

*Primary Examiner* — Albert Wang
(74) *Attorney, Agent, or Firm* — Grossman, Tucker, Perreault & Pfleger, PLLC

(57) ABSTRACT

A method and apparatus for seamless frequency sequestering is herein described. In response to a frequency throttle event, controlling software, such as an OS, is provided access to a throttled amount of frequency associated with the frequency throttle event, while another amount of frequency is transparently sequestered for performance of non-controlling software tasks.

28 Claims, 4 Drawing Sheets

SEAMLESS FREQUENCY SEQUESTERING

FIELD

This invention relates to the field of computer systems and, in particular, to efficient processor utilization.

BACKGROUND

Advances in semi-conductor processing and logic design have permitted an increase in the amount of logic that may be present on integrated circuit devices. In addition, smaller and more efficient transistor design has resulted in integrated circuits capable of operating at higher frequencies. Recent microprocessors designers have developed methods to save power during periods of low utilization. For example, Speed-Step™ by Intel Corporation allows for frequency of a processor to be dynamically changed by software. Often software, such as an Operating System (OS), includes code/drivers, which may be integrated in power management code, to interface with the frequency scaling capability of a processor.

Typically, stepping intervals are referred to in frequency intervals, such as a capability of scaling processor frequency in 100 MHZ intervals. However, frequency scaling is usually accomplished through scaling of voltage. As a result, an OS may request frequency throttling, and the processor, in response, scales voltage to accordingly scale frequency.

However, during some operating conditions, such as low utilization of a processor by an operating system (OS), the OS may request frequency of the processor to be throttled. However, when the frequency is throttled to a level requested by software, platform tasks may not be taken into account. As a result, the throttled execution power may be split by the OS and platform tasks, which potentially results in inefficient processor utilization, as the previously throttled amount of frequency could have been available to the platform.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific frequency throttling events, specific frequency division, specific period events to provide adequate processor instance execution access, specific Operating System (OS) and Non-OS related tasks, etc. in order to provide a thorough understanding of the present invention. It will be apparent, however, to one skilled in the art that these specific details need not be employed to practice the present invention. In other instances, well known components or methods, such as code/drivers for initiating a frequency throttle request, execution resource multiplexing, specific memory map reservation processes, specific initialization/boot processes, and specific microprocessor and system architectural details, have not been described in detail in order to avoid unnecessarily obscuring the present invention.

The method and apparatus described herein are for seamlessly sequestering frequency of a processor. Specifically, frequency sequestering is primarily discussed in reference to an illustrative multi-processing element processor capable of frequency throttling. However, the methods and apparatus for sequestering frequency are not so limited, as they may be implemented in associated with any frequency dependent integrated circuit.

Figure 1:
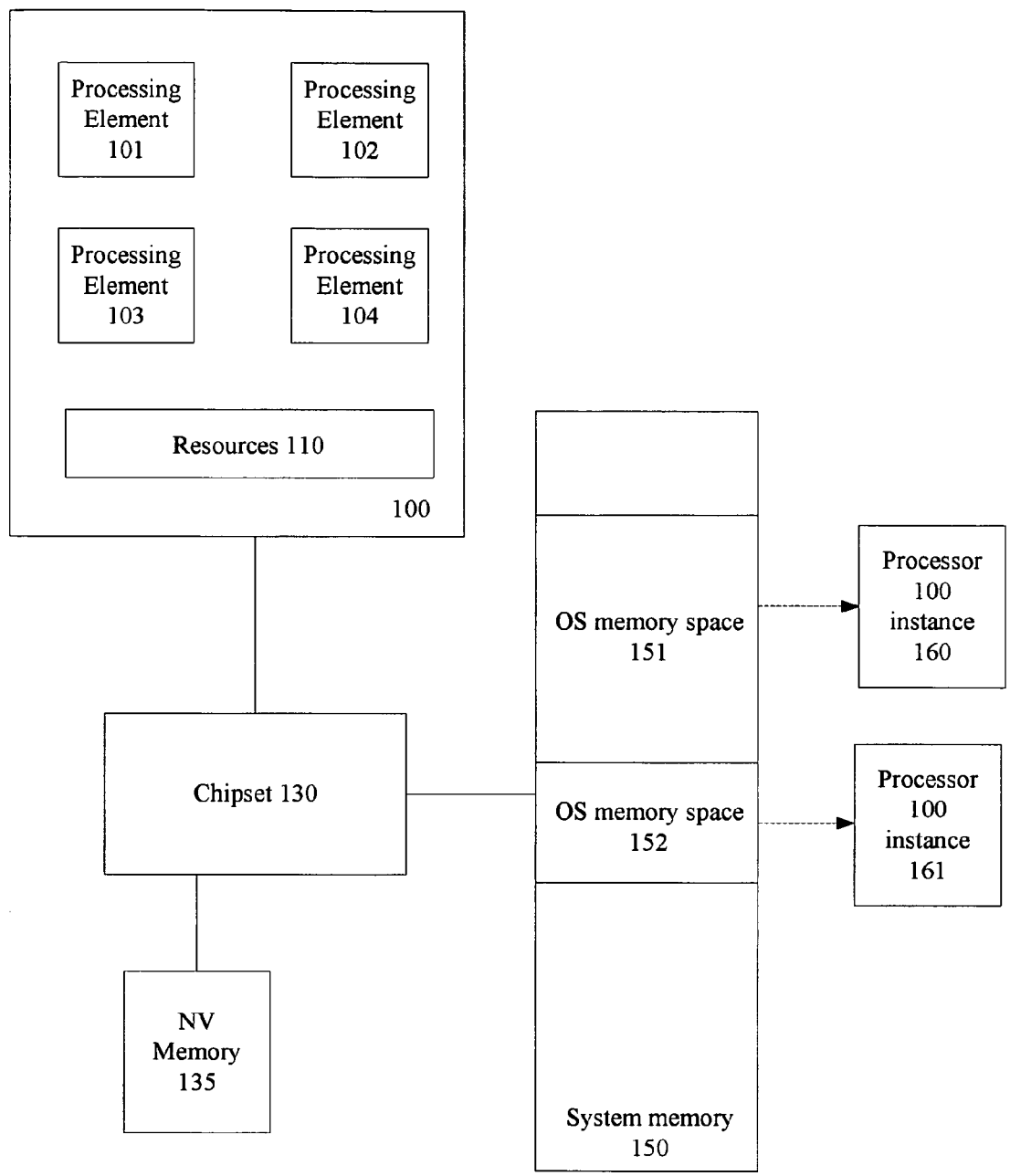
FIG. 1 illustrates an embodiment of a system including a processor having multiple processing elements, where two instances of the processor are associated with different memory ranges.

Referring to FIG. 1, an embodiment of a system including a processor having multiple instances of a processor associated with multiple memory spaces is illustrated. Processor 100 includes any processor, such as a micro-processor, an embedded processor, a digital signal processor (DSP), a network processor, or other device to execute code. In one embodiment, processor 100 is capable of frequency throttling. As an example, processor 100 may be capable of receiving frequency throttle requests from software, and throttling frequency, accordingly. Note, as discussed above, frequency throttling may include direct throttling of clocking frequency, as well as potentially indirect scaling of voltage to scale frequency. As illustrated, processor 100 includes four processing elements 101-104; although, any number of processing elements may be included in processor 100.

A processing element refers to a thread unit, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. As an example, a physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread, which may also be referred to as a physical thread, typically refers to any logic located on an integrated circuit capable of maintaining an independent architectural state, wherein the independently maintained architectural states share access to execution resources. Therefore, as can be seen, multiple software threads, such as multiple replications of a single-threaded application, in one embodiment, are capable of being executed in parallel on multiple processing elements, which may include a combination of any of the aforementioned processing elements, such as cores or hardware threads.

Also illustrated in processor 100 are resources 110, which typically include registers, units, logic, firmware, memory, and other resources to execute code. As stated above, some of resources 110 may be partially or fully dedicated to processing elements, while others are shared among processing elements. For example, smaller resources, such as instruction pointers and renaming logic may be replicated for physical threads. Some resources, such as re-order buffers in a reorder/retirement unit, instruction lookaside translation buffer (ILTB), load/store buffers, and queues may be shared through partitioning. Other resources, such as general purpose internal registers, page-table base registers, low-level data-cache, a data-TLB, execution unit(s), and an out-of-order unit are potentially fully shared among threads. In contrast, cores may have dedicated execution resources, while sharing at least a portion of a higher level cache, such as a second level cache (L2).

In one embodiment, which is discussed in more detail below, resources 110 include a processor pipeline, which may include any number of pipeline stages. Common examples of pipeline stages include an instruction pointer stage, a fetch stage, a decode stage, a drive stages, and allocate stage, a renaming stage, a queue stage, a reorder stage, a schedule stage, a dispatch stage, an execution stage, a memory access stage, and a register access stage. Note this list of stages includes an exemplary non-exhaustive list of processor pipeline stages, as any known pipeline stages may be included in processor 100.

Often selection logic to select operations for each stage or operations/information from queues within the pipeline is capable of multiplexing between operations/information for multiple threads/tasks. Similarly, in the embodiment discussed below, the selection logic is biased towards selecting operations from controlling software, such as an OS, and other tasks, such as platform tasks, to provide appropriate portions of frequency to the OS and the platform tasks.

Processor 100, as illustrated, is coupled to system memory 150 through chipset 130. In one embodiment, chipset 130 includes a collection of controller hubs. For example, a memory controller hub (MCH) may connect processor 100 to system memory 150. Here, the MCH is often coupled to an Interconnect Controller Hub (ICH), which is to connect input/output (I/O) devices to the system. However, chipset 130 is not so limited, as it may include any combination of integrated circuit(s) and/or controller hub(s) to connect devices both within and external to the system.

As depicted, non-volatile (NV) memory 135 is also coupled to chipset 130. In one embodiment, NV memory 135 includes a flash device, or other non-volatile memory device, to hold Basic Input/Output Software (BIOS) code. BIOS code may include traditional legacy BIOS code, Extensible Firmware Interface (EFI) code, or other system initialization code. Note that BIOS code, such as EFI code, not only provides an initialization platform, but also often provides a firmware interface for software to the system's hardware during runtime. In some instances, a portion of NV memory 135 may be mapped into a system memory space.

System memory 150 is often a volatile memory to be shared by system devices. Common examples of system memory 150 include a Random Access Device (RAM), Static RAM (SRAM), Dynamic RAM (DRAM), Double Data Rate (DDR) RAM, as well numerous other commonly known system memory devices. However, as stated above, both physical system memory 150 and other non-volatile memory, such as NV memory 135, may be part of a memory map that is shared among system devices or reserved for individual devices.

Often during initialization, the memory map for the system is constructed, which potentially includes any number of memory ranges, such as OS memory space 151 reserved for, i.e. associated with, an operating system. Other common memory spaces, which may potentially overlap or be separate from OS memory space 151, include a Virtual Machine Control Structure (VMCS) range, a device reserved memory range, and other reserved or shared memory ranges.

In one embodiment, frequency is capable of being sequestered from processor 100. As an example, a portion of processor 100's operating frequency may be dedicated to an OS or user-level code, while another portion of the operating frequency is sequestered for the system or platform to enable efficient utilization of processor 100's execution potential.

Note that a portion of frequency, in one embodiment, refers to a relative term of an amount of execution time, a number of execution cycles, a number of periods, or other execution metric averaged over an amount of time.

Figure 4:
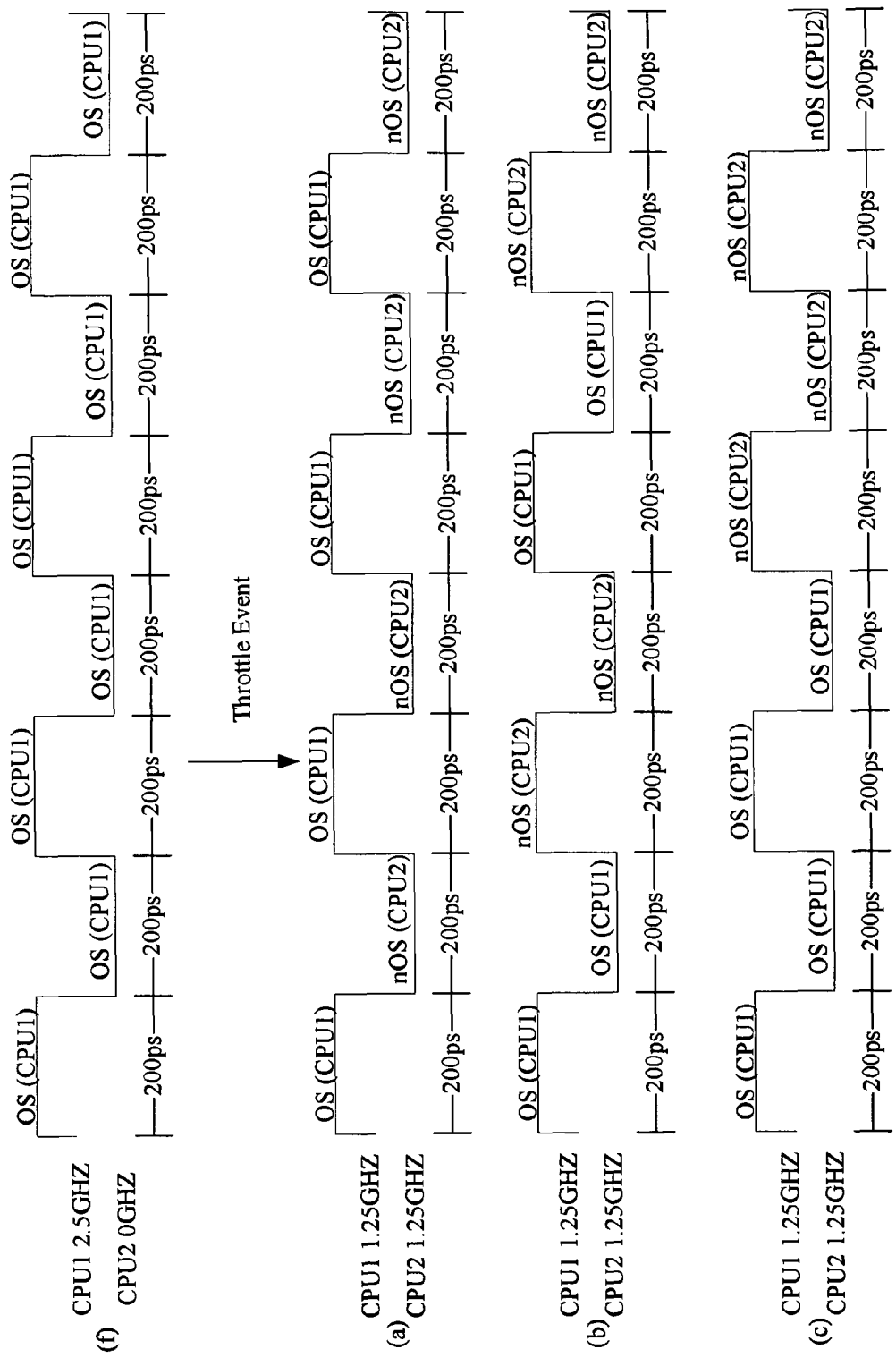
FIG. 4 illustrates an embodiment of a timing diagram depicting multiple methods for dividing frequency between processor instances.

As illustrated in FIG. 4, as well as discussed in more detail in reference thereto, numerous potential methods for providing and/or exposing an amount of frequency to processor instances exist. In one embodiment, operations for controlling software, such as an OS, are performed/executed at a requested throttled frequency, while non-OS tasks are performed during intervening cycles, periods, or amounts of time. Specifically, FIG. 4 version (a) illustrates OS operations being performed at an actual requested throttle frequency of 1.25 GHz, while the non-OS tasks are performed in intervening cycles.

In contrast, as FIG. 4 versions (b) and (c) illustrate, exposing a portion of frequency or periods associated therewith, in one embodiment, includes executing OS-related operations at a frequency different from the requested throttled frequency. However, over an amount of time, the average of operations executed for the OS related code and the non-OS related code reflect correct portions of exposed frequency. For example, in versions (b) and (c) of FIG. 4, operations for the OS are performed at frequencies different from the requested 1.25 GHz, but over the entire illustrated amount of time half of the cycles/periods are associated with OS operations and half are associated with the non-OS operations.

In one embodiment, to enable frequency sequestering, multiple logical instances of processor 100 are created to be associated with separate tasks. In other words, for each separate task, separate memory is needed to hold separate task related information. As an example, which is illustrated in FIG. 1, OS memory space 151 is associated with first instance 160 of processor 100, while non-OS memory space 151 is associated with second instance 161 of processor 100. Here, processor 100 is not physically altered, but rather an OS executing on processor 100 is capable of accessing memory space 151, while the OS is not able to access OS memory space 152, which is reserved for non-OS related tasks. Consequently, memory space 151 for instance 160, which is associated with an OS, is to hold OS related information to be utilized for execution on processor 100, while memory space 152 for instance 161, which is associated with non-OS related tasks, is to hold non-OS related information to be utilized for execution on processor 100.

In one embodiment, memory ranges 151 and 152 are setup during initialization of the system including processor 100. For example, NV memory 135, as discussed above, may hold initialization code. The initialization code, when executed, is to associate range 151 with instance 160 of the processor, which includes setting up memory space 151 to be exposed/visible to an OS during runtime. Similarly, memory space 152 is not be exposed/visible to the OS during runtime, but rather be associated with a system related task.

Note that an OS related task, in one embodiment, includes any task or service associated with an OS or user-level code associated with the OS, such as an application executing as part of the OS. Non-OS related tasks, in one embodiment, refer to system or platform tasks, which may be similar to System Management Mode (SMM) tasks. In another embodiment, a non-OS related task refers to a firmware or other hardware interface related task, such as an Extensible Firmware Interface (EFI) related task, a Virtual Machine Monitor (VMM) related task, or other hypervisor related task. In an alterative embodiment, controlling software, such as a hypervisor or OS is associated with instance 160 through memory space 151, and a firmware interface, such as EFI, is associated with instance 161.

After initialization, the system including processor 100 enters runtime execution. As an example, processor 100 may initially expose substantially all of its frequency to an OS or other controlling software. Here, each of the processor's execution cycles are exposed to the OS or controlling software, such that executing code has access to memory space 151, but not memory space 152. Note that, in one embodiment, traditional System Management Interrupt (SMI), other interrupt processing/handling, or other normal non-OS tasks may be performed. In this example, it may be said that substantially all of a number of periods and/or execution cycles are exposed/available to the OS, even though the OS does not utilize each execution cycle. Note that these "normal" interruptions are often not seamless or transparent, as the OS if typically aware of the interruption and loss of execution time associated with each, such as entering SMM to handle an SMI.

In contrast, when the controlling software, such as an OS, generates a frequency throttling request, processor 100 potentially seamlessly exposes a portion of the operating frequency to second instance 161 of processor 100 associated with non-OS related tasks. As an example, assume processor 100 is operating at 2 GHZ and an OS requests a 500 MHZ throttle of frequency. Here, 500 MHZ worth of execution cycles or periods are exposed to instance 161 to perform other tasks, while 1.5 GHZ of execution cycles or periods are exposed to the OS. As can be seen, the dynamic shift of frequency to a non-OS related task is transparent to the OS, since the OS requested a throttle of frequency to 1.5 GHZ, which is the current amount of frequency exposed to the OS. However, here instead of actually throttling processor 100, other non-OS tasks are afforded extra execution cycles/frequency of 500 MHZ, which is transparent to the OS.

The balance of exposing frequency to OS and non-OS related tasks, in one embodiment, is dynamically altered during runtime, in response to throttling events, to provide efficient processor utilization. For example, more frequency is provided to an OS in response to a frequency throttle event requesting an increase in processor 100's frequency from the OS. Additionally, less frequency is exposed to the OS in response to a frequency throttle event requesting a decrease in processor 100's frequency.

In one embodiment, frequency sequestering is implemented in conjunction with traditional frequency throttling. For example, sub-frequency sequestering states of more general traditional frequency throttling states exist. Here, in response to a throttle request, processor 100 includes the capability to alter its frequency and how much of that altered frequency is exposed to OS and non-OS related tasks. Moreover, software, firmware, hardware, or a combination thereof, in one embodiment, is to determine whether to alter actual frequency, sequester frequency from the OS for non-OS related tasks, or a combination thereof based on any number of factors, such as system performance, platform need for execution time, frequency throttle events from the OS, power consumption, and other known throttle or performance factors. In another embodiment, traditional frequency throttling is disabled, while frequency sequestering is performed transparently from the perspective of controlling software, such as an OS.

As discussed above, frequency throttle events, in one embodiment, include requests from the OS, such as a request to throttle in response to a low utilization, or expected low utilization, of processor 100 by OS related code, as well as a request to increase frequency in response to a high utilization, or expected high utilization, of processor 100. However, frequency throttling events are not so limited, as they may include any synchronous or asynchronous event generated by hardware, firmware, software, or a combination thereof to request processor 100 to either increase or decrease a frequency.

Figure 2:
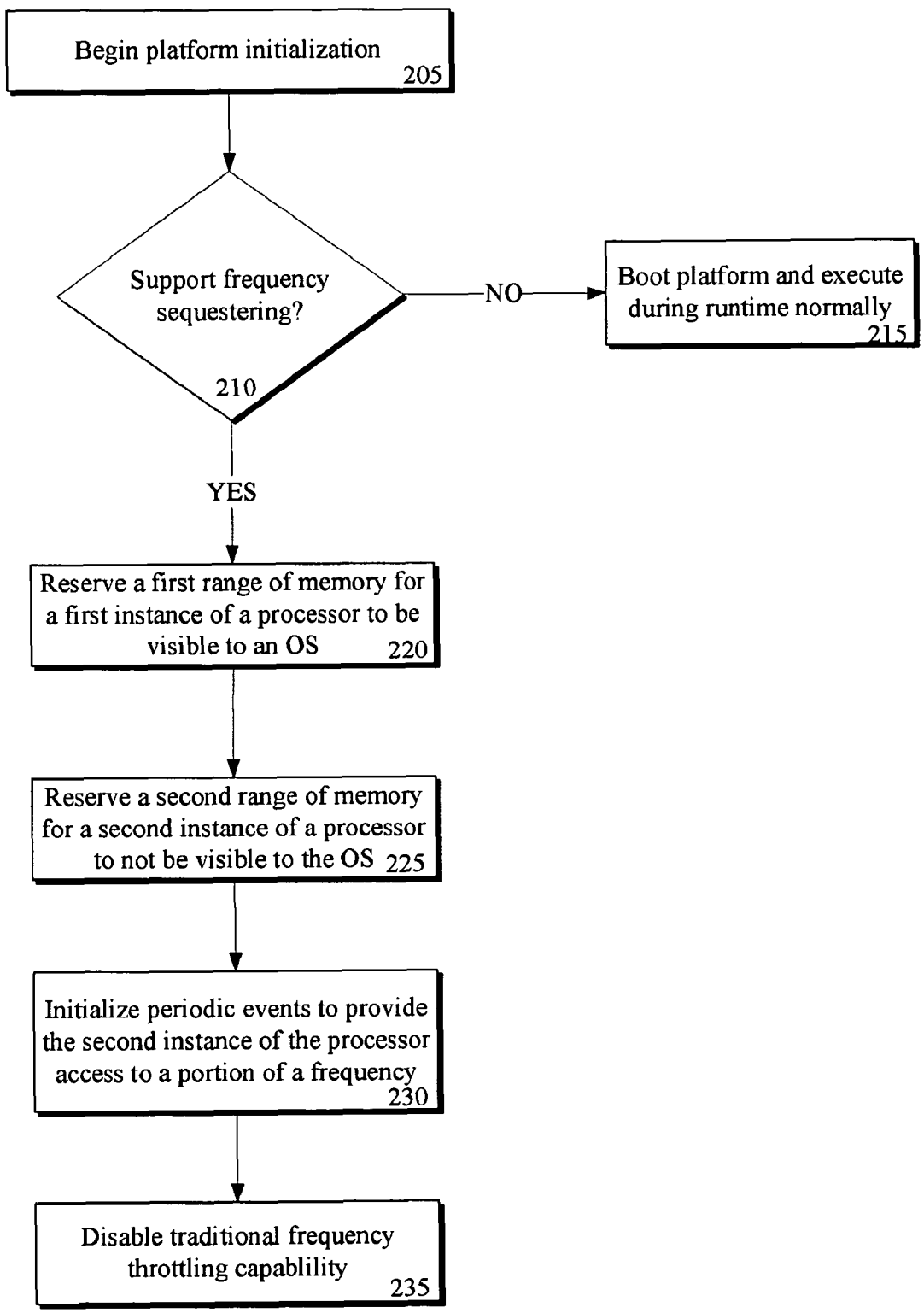
FIG. 2 illustrates an embodiment of a flowchart for a method of seamless frequency sequestering.
Figure 3:
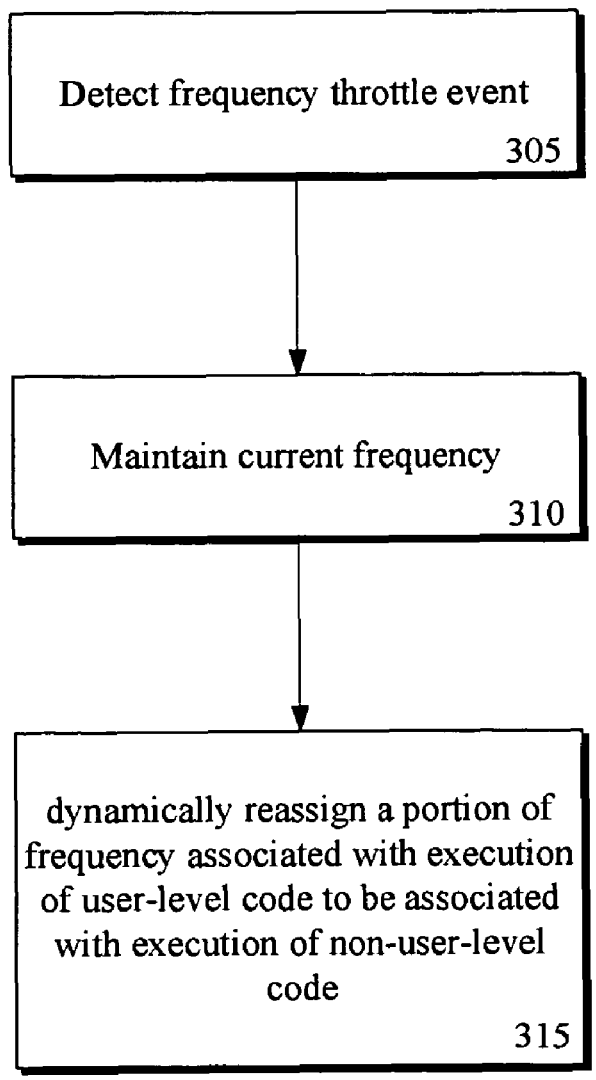
FIG. 3 illustrates another embodiment of a flowchart for a method of seamless frequency sequestering.

Turning to FIG. 2, an embodiment of a flowchart for a method of initializing a platform to enable frequency sequestering is illustrated. Note that the blocks of the flowcharts from FIGS. 2 and 3 are illustrated in a substantially serial fashion. However, during operation, these blocks are not limited to being performed in that order, and may in fact, be at least partially performed in parallel or in a different order. For example, reservation of memory ranges/space in blocks 220 and 225 may be performed in parallel or in a different initialization order.

In block 205, platform initialization is started. Normal initialization routines are performed, such as Power On Self-Test (POST) and initialization of platform devices. As stated above, in one embodiment, a non-volatile memory, such as a flash device, holds the initialization code to be executed by a processor. Note that in some initialization architectures, such as in an EFI architecture, the initialization code may both be held in a non-volatile memory, as well as provided through drivers and other code within the system.

In decision block 210, it is determined if the system supports frequency sequestering. In one embodiment, the determination is made based on existence or non-existence of a portion of initialization code to setup frequency sequestering. Here, if code does not exist to initialize frequency sequestering, then in flow 215 the rest of the boot operations and runtime execution are performed normally.

However, if frequency sequestering is supported, then in flow 220 a first range of memory for a first instance of a processor is reserved to be visible to an OS or other controlling software. Normal reservation and memory allotment techniques for building a memory space to be associated with software may be performed. For example, page table structures in the processor are filled with page structure information and appropriate attributes.

Similarly, in block 225 a second range of memory, which may also be referred to as a memory space, is reserved for/associated with a second instance of the processor. In one embodiment, the second memory space is not to be visible to an OS or controlling software associated with the first range of memory. Here, the OS is not able to access the second memory range and modify data or information held for non-OS related tasks.

In block 230 periodic events to provide the second instance of the processor access to a portion of frequency are initialized. In one embodiment, providing a non-OS related task an amount of frequency, or a number of periods associated with a frequency, is managed through use of synchronous events. As an example, a timer, such as a watchdog timer, is initialized to an amount of time, a number of periods, a number of execution cycles, or an amount of frequency to be provided to an OS. During the period that the timer is counting, i.e. non-zero for a watchdog timer, the processor executes OS related code. However, when the timer expires, the processor then executes code and/or operations associated with the non-OS related task. In other words, the timer is utilized to expose a portion of periods/frequency to the OS, and when the timer expires a second portion of periods/frequency is exposed to the non-OS related task.

In one embodiment, a second timer, which may include the first timer reset to a second count value, is utilized in a similar manner to determine the duration of execution of the non-OS related task. For example, the non-OS related task executes when the second timer is counting, and upon expiration of the second timer, the OS related code is again executed. Here, timers or other mechanisms may be utilized to essentially perform time multiplexing of operations associated with OS and non-OS related code, such that the time multiplexing provides the correct amount of frequency or number of periods to the OS and non-OS tasks. In this example, counter/timers are initialized in block 230 to provide the first instance of the processor associated with an OS-related task and the second instance of the processor associated with a non-OS related task access to their respective portions of periods/frequency of the processor.

In one embodiment, the first instance of the processor associated with an OS-related task is to be provided, by default, access to substantially all of the processor's frequency. In other words, software is provided normal full access to the processor with the understanding that other events, such as SMIs, may be handled on the processor that takes execution time away from the OS. However, as stated above, these events are often not transparent to the OS, as the OS is often informed of these events and recognizes the execution cycles taken to handle them.

Although the discussion of multiplexing with regards to use of timers is discussed above, frequency sequestering may be implemented with any known method of providing execution cycles, periods, and/or frequency to a separate task. For example, returning to FIG. 1, resource 110 of processor 100, in one embodiment, includes a pipeline having numerous pipe stages. Often multiple pipe stages of a pipeline include selection logic, such as multiplexers, shift registers, queues, or other selection mechanisms, to select operations for further processing. In fact, prior multi-threaded processors often implement time multiplexing selection for different OS threads, i.e. the selection of an operation from one OS thread during one cycle and selection of another operation from another OS thread during a different cycle. Often this selection is based on providing fair access of software threads to execution resources, or access based on priority.

In contrast to fair selection or selection based on priority, in one embodiment, logic is included in a processor to bias pipe stage selection mechanisms, such as multiplexers, shift registers, queues, or other selection mechanisms, to select OS related task operations and non-OS related task operations in accordance with providing the correct frequency to the OS task and the non-OS related task, as specified by a frequency throttling event.

For example, an OS requests a processor to throttle from 2.5 GHZ to 1.25 GHZ, as in FIG. 4. Instead of throttling the frequency of the processor, the biased selection logic selects an OS related operation during every other execution cycle and a non OS related operation in between those cycles, as illustrated in FIG. 4 timing diagram version (a). As a result, the OS is provided transparent access to 1.25 GHZ of execution cycles, i.e. half of the periods for a processor operating at 2.5 GHZ. The OS believes the clock has been slowed, in that the OS still has access to each 1.25 GHz execution cycle. However, unbeknownst to the OS, during every other cycle work for a non-OS related task is being done; hence, the transparent nature, in relation to the OS, of seamlessly sequestering frequency for a non-OS related task in response to a throttle event.

Furthermore, in one embodiment, during initialization a traditional frequency throttling capability of the processor is disabled in block 235. Here, instead of traditional frequency throttling, the "throttled" frequency is instead reallocated to non-OS related tasks. Consequently, the potential problem of actually throttling frequency and also dedicating a portion of the frequency to a non-OS related task for a processor unable to comprehend such action is avoided. For example, assume that the traditional frequency throttling and frequency sequestering is enabled in a system unable to comprehend both frequency throttling and frequency sequestering at the same time. In this example, a processor requested to be throttled from 2.5 GHz to 1.25 GHz, throttles the processor to 1.25 GHz and then provides half of the frequency to a non-OS related task, which leaves only 625 MHz of frequency for the OS instead of the requested 1.25 GHz. Therefore, in a processor incapable of comprehending both actions, traditional frequency throttling, in one embodiment, is disabled in response to frequency sequestering being enabled.

However, in another embodiment, a processor is capable of comprehending both traditional frequency throttling and frequency sequestering, either through hardware, firmware, or execution of software. Here, traditional frequency throttling is not disabled. Instead, hardware, software, firmware, or a combination thereof is capable of determining if frequency should be actually throttled, and furthermore, if a portion of the frequency should be sequestered for non-OS tasks based on any number of factors, such as the throttle request, a power factor, a performance factor, and an amount of non-OS related work available. Continuing the example from above, where an OS requests a throttle from 2.5 GHz to 1.25 GHz, depending on the amount of non-OS related work available, a processor may select to throttle to 1.5 GHz and then expose 250 MHz to non-OS related tasks. Essentially, the OS is transparently provided 1.25 GHz of frequency, as requested by the frequency throttle request, thee non-OS related tasks are provided 250 MHz of frequency, and the remaining 750 MHz of the processor's frequency capability is throttled to save power.

Referring next to FIG. 3, an embodiment of a flowchart for a method of frequency sequestering is illustrated. In block 305, a frequency throttle event is detected. In one embodiment, a frequency throttle event includes a request from controlling software to either increase or decrease an operating frequency of a processor. As another example, any event to initiate an increase or decreasing in frequency of a processor, whether originating from hardware, firmware, software, or a combination thereof includes a frequency throttling event.

In block 310, the current frequency, in one embodiment, is maintained in response to detecting the throttle event. In an alternative embodiment, when both traditional frequency throttling and frequency sequestering are enabled, the current frequency is potentially scaled accordingly.

A portion of frequency associated with execution of user-level code is dynamically reassigned to be associated with execution of non-user level code in block 315. As stated above, frequency, and a portion thereof, in one embodiment, is a relative term. As an example, reassigning frequency may refer to reassigning processor cycles, execution cycles, time periods, or portions thereof. A specific illustrative example of reassigning periods/frequency is discussed in reference to FIG. 4 below.

In one embodiment, counters and/or watchdog timers are utilized to provide access to a processor's resources for user-level code, such as a guest application for an OS, and non-user level code, such as platform related code. Here, a first counter expires periodically over an amount of time. Upon expiration, access to the processor's resources is transferred from user-level code to platform related code. As the most simplified illustrative example, a counter is initialized to a first number of cycles and/or periods. During the count, the user-level code is executed, and in response to expiration of the counter, the platform related code is executed. The first counter is initialized to periodically expire in this fashion to provide the appropriate access for the platform related code to a processor's resources. Note that the same, or a similar counter may be utilized in the same manner to transfer control back from the platform code to the user-level code.

In this embodiment, dynamically reassigning a portion of frequency includes modifying counter values to provide different amounts of access time. For example, assume a processor is operating at 2.5 GHz. Here, it is further assumed that 2 GHz of frequency is available for a first instance of the processor associated with the OS, while 500 MHz of frequency is available for a second instance of the processor associated with non-OS related tasks. In one embodiment, a first timer is set to periodically expire to provide the first instance of the processor an average of 2 GHz out of 2.5 GHz of execution time/periods over an amount of time, while providing the second instance an average of 500 MHz out of 2.5 GHz for the amount of time.

Next a frequency throttle request is received from the OS to throttle the processor to 1.25 GHz. Here, dynamic reassignment of the frequency includes, modifying at least the first timer to periodically expire to provide the OS with an average of 1.25 GHz out of 2.5 GHz of execution cycles/periods over an time, and/or to provide the OS with an average of 1.25 GHz out of 2.5 GHz of execution cycles/periods over the amount of time. Note that in one embodiment with only two processor instances, providing one instance a portion of frequency, then leaves the other instance the remaining portion of frequency.

As an example, in reference to FIG. 4, the timer is modified from the previous value to implement the frequency reassignment of example (c). Here, the timer periodically expires every 800 ps. As illustrated, OS related operations are performed during the first 800 ps, i.e. while the timer is counting, and non-OS related operations are performed during the subsequent 800 ps in response to expiration of the timer. As stated above, either the same timer, or a second timer, is utilized for timing the duration of the non-OS execution in a similar manner to the first timer. Note that in example (c) the OS operations are not executed at a frequency of 1.25 GHz, but rather at the original frequency of 2.5 GHz. However, example (c) illustrates the potential relative nature of frequency, periods, and cycles in different embodiments, in that, over the full 8 cycles of 1600 ps, the OS is afforded access to half of those cycles, which results in essentially 1.25 GHz of 2.5 GHz in periods/frequency over that amount of time.

The discussion above included reference to the use of timers. However, assigning and reassigning frequency is not so limited. As discussed above, selection logic for different stages of a pipeline in a processor, in one embodiment, is biased towards providing the correct frequency allotment to OS and non-OS tasks. In a combinational embodiment, the timers may be utilized to bias the selection logic. However, other known logic, such as shift registers set with a bias pattern, may be utilized to bias selection logic. Here, the bias pattern is altered/modified to perform dynamic reassignment of frequency. Furthermore, any other known logic or processor units utilized for time multiplexing may be utilized to provide appropriate frequency access for separate tasks to the processor's resources.

Referring to FIG. 4, illustrative embodiments of a timing diagram for providing frequency to different instances of a processor are illustrated. Originally, in example (f), all of the cycles of a 2.5 GHz processor are exposed to an OS, i.e. OS operations are capable of being performed every cycle. However, a throttle event is detected indicating a requested throttle of the processor from 2.5 GHz to 1.25 GHz.

Specifically, FIG. 4 illustrates examples (a), (b), and (c) for reassigning, associating, exposing, or providing 1.25 GHz of periods, frequency, or cycles for both a first instance of a processor associated with the OS and a second instance of the processor associate with the non-OS task. Note that reassigning may be done through use of selection logic, timers, other logic, or a combination thereof to time multiplex performance of operations from separate OS and non-OS tasks. In example (a), the OS operations are actually executed at the requested throttled frequency of 1.25 GHz, while the non-OS related operations are executed in the intervening cycles, which also happens to be at a frequency of 1.25 GHz. As can be seen from this example, in one embodiment, OS operations are performed at the requested frequency, and intervening cycles or periods are exposed to the non-OS task.

In example (b), OS operations are executed each cycle and for a full period, while the next two cycles, i.e. full period, access is provided to the non-OS task. In contrast, example (c) depicts four consecutive cycles, i.e. two periods, exposed to the OS and the next four consecutive cycles exposed to the non-OS task. As these examples illustrate, reassigning cycles, periods, or frequency is, in one embodiment, relative to a number of cycles, periods, or frequency over an amount of time. Note that in all the examples half of the total periods and cycles are associated with the OS and the other half are associated with the non-OS task over the amount of illustrated time.

Therefore, as can be seen from above, traditional frequency throttling may either be disable or performed in conjunction with seamless frequency sequestering. Controlling software, such as an OS, requests frequency throttling of a processor. As a result, the processor transparently provides the controlling software to the throttled frequency. However, the remaining frequency is potentially reassigned to non-controlling software tasks, such as platform tasks. Therefore, platform tasks may be efficiently performed during throttling periods of controlling software, while remaining transparent to the controlling software.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a processor to operate at a frequency, the processor including logic to expose a first portion of the frequency to an operating system (OS) and to expose a second portion of the frequency to a non-OS task, wherein the second portion of the frequency is not to be exposed to the OS, and wherein the first portion and the second portion of the frequency are to be dynamically modified in response to a throttle event.

2. The apparatus of claim 1, wherein the throttle event is selected from a group of throttle events consisting of: a frequency throttle event associated with a low utilization of the processor by code associated with the OS, a frequency throttle event associated with a high utilization of the processor by code associated with the OS, a frequency throttle request from the OS, a general frequency throttle event, a thermal throttle event, a power throttle event.

3. The apparatus of claim 1, wherein comprises: the logic to expose the first portion of the frequency to the OS and to expose the second portion of the frequency to the non-OS task, wherein the second portion of the frequency is not to be exposed to the OS comprises: a watchdog timer to expire upon a count associated with the first portion of frequency, wherein execution logic in the processor is to execute operations associated with the OS during the count of the watchdog timer, and in response to the count of the watchdog timer expiring, the execution logic is to execute operations associated with the non-OS related task.

4. The apparatus of claim 3, wherein the first portion and the second portion of the frequency are to be dynamically modified in response to a throttle event comprises: in response to the throttle event, modifying the count of the watchdog timer to a modified count, such that the execution logic is to execute operations associated with the OS during the modified count of the watchdog timer, and in response to the modified count of the watchdog timer expiring, the execution logic is to execute operations associated with the non-OS related task.

5. The apparatus of claim 1, wherein comprises: the logic to expose the first portion of the frequency to the OS and to expose the second portion of the frequency to the non-OS task, wherein the second portion of the frequency is not to be exposed to the OS comprises:
selection logic associated with a pipeline of the processor to select between a plurality of operations for further processing in the pipeline of the processor; and
bias logic coupled to the selection logic to bias the selection logic to select a first number operations of the plurality of operations, which are to be associated with the OS, at a first rate associated with the first portion of frequency for further processing in the pipeline, and to bias the selection logic to select a second number of operations of the plurality of operations, which are to be associated with the non-OS task, at a second rate associated with the second portion of frequency for further processing in the pipeline.

6. The apparatus of claim 1, wherein the logic to expose the first portion of the frequency to the OS and to expose the second portion of the frequency to the non-OS task comprises: the logic to initiate performance of operations associated with the OS at a first frequency corresponding to the first portion of frequency and to initiate performance of operations associated with the non-OS related tasks at a second frequency corresponding to the second portion of frequency.

7. The apparatus of claim 1, wherein the first portion of the frequency includes a first number of periods associated with the first portion of the frequency over an amount of time, and wherein the second portion of the frequency includes a second number of periods associated with the second portion of the frequency over an amount of time.

8. The apparatus of claim 7, wherein the first number of periods over the amount of time is to include substantially all of a total number of periods within the amount of time and the second number of periods over the amount of time is to include substantially none of the total number of periods.

9. The apparatus of claim 8, wherein the first number of periods over the amount of time is to include substantially all of the total number of periods and the second number of periods over the amount of time is to include substantially none of the total number of periods are to be dynamically modified in response to a throttle event comprises: in response to detecting the throttle event, the first portion is to be reduced from substantially all of the total number of periods by a modified number of periods and the second portion to be increased from substantially none of the number of periods by the modified number of periods.

10. A non-transitory computer readable medium having program code stored thereon which, when executed by a processor on a computing platform, causes the processor to perform the operations of:
  reserving a first range of memory for a first instance of a processor, the first range of memory to be visible to an operating system; and
  reserving a second range of memory for a second instance of the processor, the second range of memory to be associated with platform related code and not to be visible to the operating system.

11. The medium of claim 10, wherein the program code which, when executed by the machine, causes the machine to further perform the operations of: initializing periodic events to transparently provide the second instance of the processor a portion of a frequency of the processor.

12. The medium of claim 10, wherein the program code which, when executed by the machine, causes the machine to further perform the operations of: disabling a traditional frequency throttling capability of the processor.

13. The medium of claim 10, wherein reserving the first range of memory for the first instance of the processor, reserving the second range of memory for the second instance of the processor, and disabling the traditional frequency throttling capability of the processor are performed during initialization of the machine.

14. The medium of claim 10, wherein the program code which, when executed by the machine, causes the machine to further perform the operations of: associating the first instance of the processor with a first portion of a frequency of the processor and associating the second instance of the processor with a second portion of the frequency of the processor.

15. The medium of claim 14, wherein the first portion of the frequency of the processor includes a first number of processor cycles of the processor over time and the second portion of the frequency includes a second number of processor cycles of the processor over time.

16. The medium of claim 15, wherein associating the first instance of the processor with the first number of processor cycles of the processor over time and associating the second instance of the processor with the second number of processor cycles of the processor over time comprises: initializing a periodic event to be handled by the processor to provide the second instance of processor the second number of processor cycles of the processor over time.

17. The medium of claim 16, wherein initializing a periodic event to be handled by the processor to provide the second instance of processor the second number of processor cycles of the processor over time comprises: initializing a first timer to expire periodically over the first number of processor cycles to be handled by the processor to activate the second instance of the processor and initializing a second timer to expire the second number of processor cycles after the expiration of the first timer to activate the first instance of the processor.

18. A system comprising:
  a processor;
  a memory associated with the processor to hold initialization code, wherein the initialization code, when executed by the processor, is to associate a first instance of the processor with a first range of memory, which is to be exposed to an operating system, and is to associate a second instance of the processor with a second range of memory, which is not to be exposed to the operating system, and wherein the second instance of the processor is to be associated with execution of platform tasks during runtime.

19. The apparatus of claim 18, wherein the memory includes a non-volatile memory device, and wherein the initialization code includes Basic Input/Output Software (BIOS) code.

20. The apparatus of claim 18, wherein the BIOS code includes Extensible Firmware Interface (EFI) code.

21. The apparatus of claim 18, wherein the initialization code, when executed by the processor, is further to initialize a timer to periodically expire after a first amount of time, wherein the processor is to execute the platform tasks utilizing the second range of memory to be associated with the second instance of the processor for a second amount of time in response to the timer expiring.

22. The apparatus of claim 21, wherein the first amount of time and the second amount of time are modified in response to a frequency throttle event.

23. The apparatus of claim 22, wherein the frequency throttle event include s a reduce frequency event generated by the operating system, and wherein the first amount of time and the second amount of time are modified in response to the reduce frequency event comprises: reducing the first amount of time by a modified amount of time and increasing the second amount of time by the modified amount of time.

24. A method comprising:
  detecting a frequency throttle request associated with controlling software executing on a processor operating at a current frequency, the frequency throttle request to request the processor to throttle to a reduced frequency; and
  reassigning an amount of the current frequency associated with execution of the controlling software to be associated with execution of platform related tasks in response to detecting the frequency throttle request associated with the controlling software, wherein the reassigning of the amount of the frequency is transparent to the controlling software.

25. The method of claim 24, wherein the controlling software includes an operating system (OS), and wherein detecting a frequency throttle request associated with OS includes receiving the frequency throttle request with the processor from the OS.

26. The method of claim 24, wherein reassigning the amount of the current frequency associated with execution of the controlling software to be associated with execution of platform related tasks in response to detecting the frequency throttle request associated with the controlling soft, wherein the reassigning of the amount of the frequency is transparent to the controlling software comprises:
  executing operations associated with the controlling software at the reduced frequency; and
  executing operations associated with the platform related tasks at the amount of the current frequency to be associated with execution of platform related tasks.

27. The method of claim 24, wherein reassigning an amount of the current frequency associated with execution of the controlling software to be associated with execution of platform related tasks in response to detecting the frequency throttle request associated with the controlling soft, wherein the reassigning of the amount of the frequency is transparent to the controlling software comprises:
  executing operations associated with the controlling software for a first number of periods over an amount of time, which is associated with the reduced frequency; and
  executing operations associated with the platform related tasks for a second number of periods over the amount of time, which is associated with the amount of the current frequency to be associated with the execution of platform related tasks.

28. The method of claim 24, further comprising throttling the current frequency to an intermediate throttled frequency, which is greater than the reduced frequency, in response to detecting the frequency throttle request associated with the controlling software, wherein reassigning an amount of the current frequency associated with execution of the controlling software to be associated with execution of platform related tasks, wherein the reassigning of the amount of the frequency is transparent to the controlling software.

* * * * *